(12) United States Patent
Uno et al.

(10) Patent No.: US 10,919,413 B2
(45) Date of Patent: Feb. 16, 2021

(54) VEHICLE SEAT SYSTEM

(71) Applicants: TOYOTA BOSHOKU KABUSHIKI KAISHA, Aichi (JP); AISIN SEIKI KABUSHIKI KAISHA, Aichi (JP)

(72) Inventors: Haruki Uno, Aichi (JP); Kenji Iida, Aichi (JP); Hirotaka Torikai, Aichi (JP); Ran Wang, Aichi (JP); Soichiro Hozumi, Aichi (JP)

(73) Assignees: TOYOTA BOSHOKU KABUSHIKI KAISHA, Aichi (JP); AISIN SEIKI KABUSHIKI KAISHA, Aichi (JP)

( * ) Notice: Subject to any disclaimer, the term of this patent is extended or adjusted under 35 U.S.C. 154(b) by 119 days.

(21) Appl. No.: 16/134,198

(22) Filed: Sep. 18, 2018

(65) Prior Publication Data

US 2019/0084446 A1 Mar. 21, 2019

(30) Foreign Application Priority Data

Sep. 19, 2017 (JP) .............................. JP2017-178775

(51) Int. Cl.
*B60N 2/02* (2006.01)
*B60N 2/22* (2006.01)
*B60N 2/10* (2006.01)

(52) U.S. Cl.
CPC ............. *B60N 2/0232* (2013.01); *B60N 2/10* (2013.01); *B60N 2/22* (2013.01); *B60N 2002/0272* (2013.01)

(58) Field of Classification Search
CPC .......... B60N 2/0232; B60N 2/10; B60N 2/22; B60N 2002/0272
See application file for complete search history.

(56) References Cited

U.S. PATENT DOCUMENTS

| 2005/0168035 A1* | 8/2005 | Boudinot ............. B60N 2/0232 297/378.1 |
| 2016/0280095 A1* | 9/2016 | Frye ....................... B60N 2/206 |
| 2017/0197522 A1* | 7/2017 | Lopez Pinana ........ B60N 2/835 |

FOREIGN PATENT DOCUMENTS

| EP | 1 692 004 | 8/2006 |
| WO | WO2005/049371 | 6/2005 |

* cited by examiner

*Primary Examiner* — Aaron L Troost
(74) *Attorney, Agent, or Firm* — Greenblum & Bernstein, P.L.C.

(57) ABSTRACT

A controller in a vehicle seat system is configured to execute a first pivot control to cause the second seatback to pivot at a first pivoting speed, a second pivot control to cause the second seatback to pivot at a second pivoting speed that is greater than the first pivoting speed, and a first determination process to determine, during execution of a tilt control, whether the second seatback will interfere with the first seatback. If the controller determines, during execution of the tilt control, that the second seatback will interfere with the first seatback, then the controller causes the first seatback to pivot and executes the first pivot control in at least a part of a pivoting process of the second seatback.

1 Claim, 8 Drawing Sheets

VEHICLE SEAT SYSTEM

CROSS-REFERENCE TO RELATED APPLICATIONS

This application claims the benefit of Japanese Patent Application No. 2017-178775 filed on Sep. 19, 2017 with the Japan Patent Office, the entire disclosure of which is incorporated herein by reference.

BACKGROUND

The present disclosure relates to a vehicle seat system comprising at least two vehicle seat.

For example, in a vehicle seat system disclosed in European Patent Application Publication No. 1692004 (Patent Document 1), during a tilt control to cause a seatback of a rear seat to tilt automatically in a seat front direction, tilting operation of the seatback of the rear seat starts after a seatback of a front seat pivots in the seat front direction.

SUMMARY

According to the tilt control of Patent Document 1, immediately after a user turns on a tilt control start switch, the seatback of the rear seat does not pivot, and only the seatback of the front seat starts to pivot. This may cause misunderstanding by the user that "a failure has occurred in the tilt control".

In one aspect of the present disclosure, it is preferable to provide a vehicle seat system that can reduce such misunderstanding.

The vehicle seat system comprises a controller that controls pivoting of a first seatback and pivoting of a second seatback, and is configured to execute a tilt control to cause the second seatback to tilt in a seat front direction.

The controller has a function to execute the following: a first pivot control to cause the second seatback to pivot at a first pivoting speed; a second pivot control to cause the second seatback to pivot at a second pivoting speed that is greater than the first pivoting speed; and a first determination process to determine whether the second seatback will interfere with the first seatback, during execution of the tilt control.

Also, during execution of the tilt control, if determining in the first determination process that the second seatback will interfere with the first seatback, then the controller causes the first seatback to pivot, and executes the first pivot control in at least a part of a pivoting process of the second seatback.

As a result, during execution of the tilt control, the second seatback pivots in addition to the first seatback. This can reduce a user's misunderstanding that "a failure has occurred in the tilt control".

During execution of the tilt control, the second seatback pivots in accordance with the first pivot control, while the first seatback is pivoting. Thus, occurrence of interference between the second seatback and the first seatback can be reduced.

During execution of the tilt control, if the second seatback pivots in accordance with the second pivot control, while the first seatback is pivoting, then the second seatback may reach a range (hereinafter referred to as an "interference range"), in which the second seatback is likely to interfere with the first seatback, before the first seatback leaves the interference range.

In contrast, according to the vehicle seat system of the present disclosure, the second seatback pivots in accordance with the first pivot control, and thus the first seatback is allowed to leave the interference range before the second seatback reaches the interference range. Accordingly, occurrence of interference between the second seatback and the first seatback can be reduced.

The vehicle seat system may be configured as described below.

For example, it is preferable that the controller execute the first pivot control when the second seatback is positioned in at least a part of a non-interference range, which is a pivoting range, in an entire pivoting range, of the second seatback and within which no interference occurs between the first seatback and the second seatback.

This enables reduction in occurrence of interference between the second seatback and the first seatback.

It is preferable that the controller have a function to execute a second determination process to determine, after the second seatback starts to tilt, whether the second seatback will interfere with the first seatback, and that the controller execute the second pivot control if determining in the second determination process that the second seatback will not interfere with the first seatback.

With such configuration, the vehicle seat system of the present disclosure enables reduced time required until completion of tilting, as compared with a case where the second seatback pivots in accordance with the first pivot control until completion of tilting.

BRIEF DESCRIPTION OF THE DRAWINGS

Some embodiments of the present disclosure will be described hereinafter by way of example with reference to the accompanying drawings, in which.

DETAILED DESCRIPTION OF THE PREFERRED EMBODIMENTS

Figure 1:
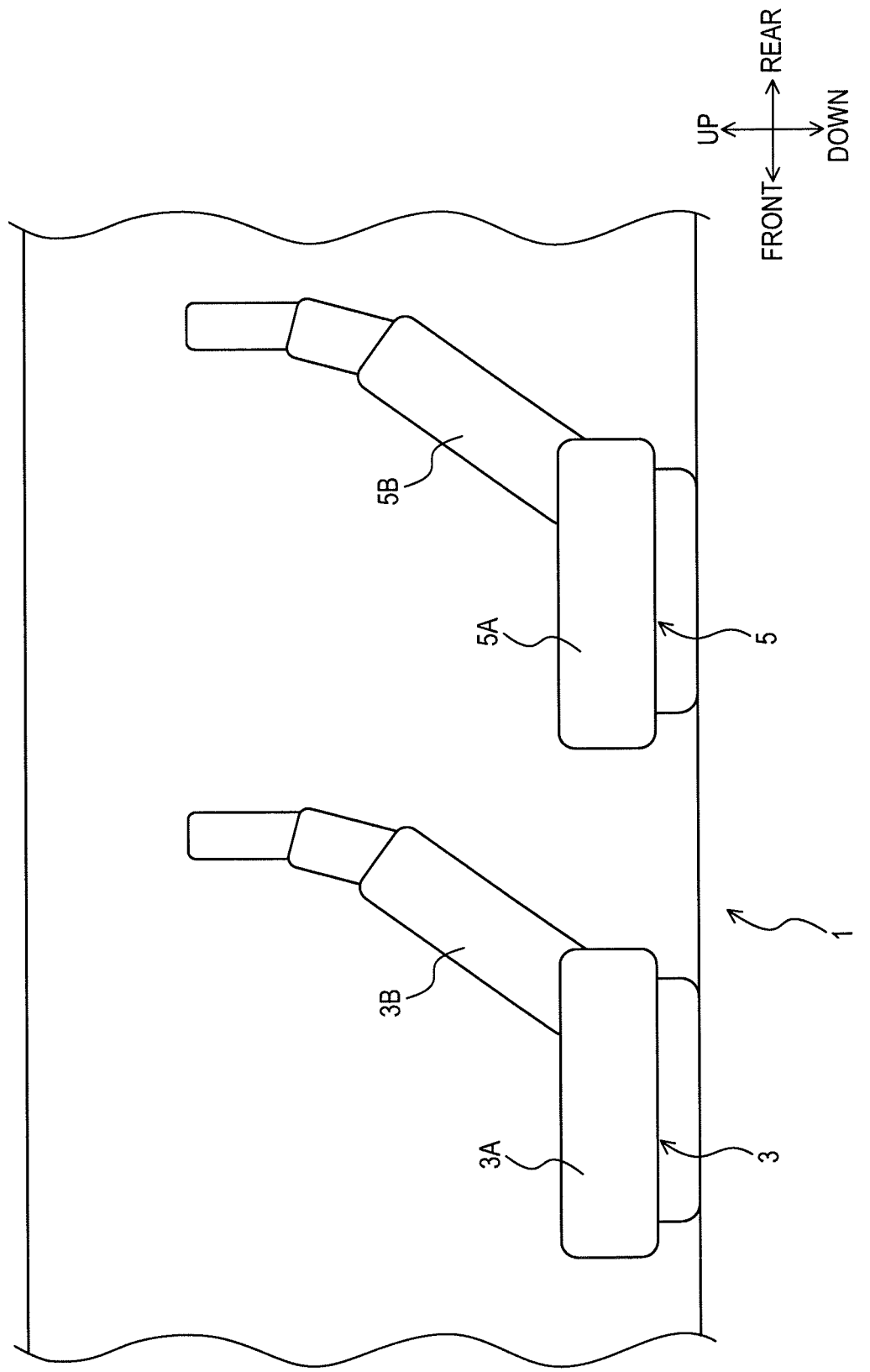
FIG. 1 is a schematic view showing a configuration of a vehicle seat system.

Arrows or other symbols indicating directions in the drawings are provided for facilitating understanding of the relationships among the drawings, and the present disclosure is not limited to the directions indicated in the drawings. The directions each mean a direction in a state where the vehicle seat in each of the embodiments is assembled to a vehicle.

First Embodiment

1. Overview of Vehicle Seat System

FIG. 1 shows a vehicle seat system 1 that comprises a first vehicle seat 3, and a second vehicle seat 5. The first vehicle seat 3 may be a front seat, and the second vehicle seat 5 may be a rear seat.

The second vehicle seat 5 is installed rearward of the first vehicle seat 3 in a vehicle interior. In a first embodiment, a seat front-rear direction coincides with a vehicle front-rear direction. In other words, the second vehicle seat 5 is installed at a vehicle rear side of the first vehicle seat 3.

The first vehicle seat 3 comprises a first seat cushion 3A and a first seatback 3B. The second vehicle seat 5 comprises a second seat cushion 5A and a second seatback 5B. The first seat cushion 3A and the second seat cushion 5A each support an occupant's buttocks.

The first seatback 3B and the second seatback 5B each support the occupant's back. The first seatback 3B is coupled to the first seat cushion 3A so as to be pivotable along the seat front-rear direction. The second seatback 5B is coupled to the second seat cushion 5A so as to be pivotable along the seat front-rear direction.

Figure 2:
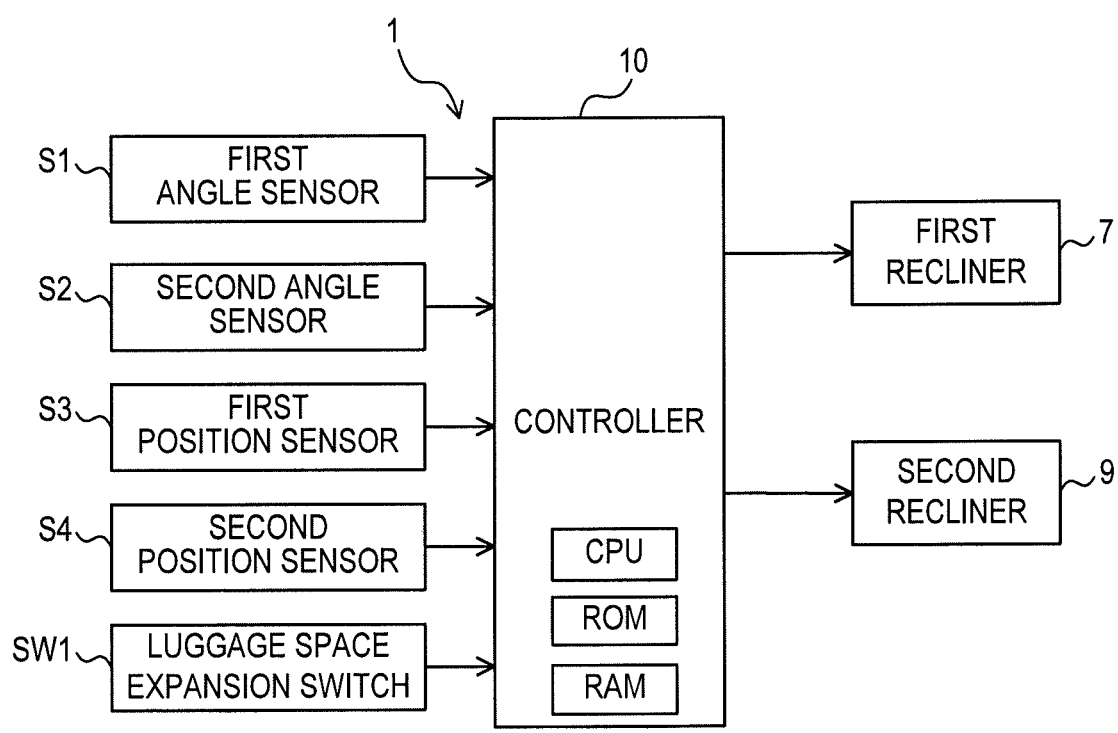
FIG. 2 is a diagram showing a configuration of a control system of the vehicle seat system.

A first recliner 7 as shown in FIG. 2, which is provided for the front seat, is an electric recliner that causes the first seatback 3B to pivot relative to the first seat cushion 3A. A second recliner 9, which is provided for the rear seat, is an electric recliner that causes the second seatback 5B to pivot relative to the second seat cushion 5A.

A controller 10 controls operation of the first recliner 7 and the second recliner 9, to thereby control pivoting of the first seatback 3B and pivoting of the second seatback 5B.

The controller 10 comprises a microcomputer that comprises a CPU, a ROM, a RAM, and other components. The controller 10 controls operation of the first recliner 7 and the second recliner 9 in accordance with a program (software) previously stored in a non-volatile storage device, such as a ROM.

The controller 10 receives input of respective output signals from a first angle sensor S1, a second angle sensor S2, a first position sensor S3, and a second position sensor S4, and a signal indicating a state of a luggage space expansion switch SW1. The first angle sensor S1 and the first position sensor S3 are for the front seat. The second angle sensor S2 and the second position sensor S4 are for the rear seat.

More specifically, the first angle sensor S1 is configured to detect a reclining angle of the first seatback 3B, and the second angle sensor S2 is configured to detect a reclining angle of the second seatback 5B.

The first position sensor S3 is configured to detect a position of the first vehicle seat 3 along the seat front-rear direction. The second position sensor S4 is configured to detect a position of the second vehicle seat 5 along the seat front-rear direction.

The luggage space expansion switch SW1 is configured to be operated by an occupant to automatically expand a luggage space in the vehicle. When the luggage space expansion switch SW1 is turned on, the controller 10 executes a tilt control to tilt at least the second seatback 5B in the seat front direction. Then, the luggage space rearward of the second vehicle seat 5 is expanded by a tilt amount of the second seatback 5B in the seat front direction.

2. Operation of Vehicle Seat System 2.1 Overview of Tilt Control

During execution of a tilt control, the controller 10 executes at least one of the following controls/processes (1) to (4). The controls/processes (1) to (4) are achieved by a program (software) previously stored in the non-volatile storage device.

(1) A first pivot control: a control to cause the second seatback 5B to pivot in the seat front direction at a first pivoting speed V1.

(2) A second pivot control: a control to cause the second seatback 5B to pivot in the seat front direction at a second pivoting speed V2 that is greater than the first pivoting speed V1.

(3) A third pivot control: a control to cause the first seatback 3B to pivot in the seat front direction, and also to execute the first pivot control in at least a part of a pivoting process of the second seatback 5B.

(4) A first determination process: a process to determine whether the second seatback 5B will interfere with the first seatback 3B.

The first determination process is executed during execution of the tilt control, more specifically, after the luggage space expansion switch SW1 is turned on and before the second seatback 5B starts to pivot in the seat front direction. The third pivot control is executed if it is determined in the first determination process, during execution of the tilt control, that the second seatback 5B will interfere with the first seatback 3B.

In the first determination process, the controller 10 determines whether the second seatback 5B will interfere with the first seatback 3B under a condition that the second seatback 5B tilts in a state where the first seatback 3B does not pivot in the seat front direction and maintains its current reclining angle.

Whether or not the second seatback 5B will interfere with the first seatback 3B is influenced by the position of the first vehicle seat 3, the reclining angle of the first seatback 3B, and the position of the second vehicle seat 5.

If a separation distance between the first vehicle seat 3 and the second vehicle seat 5 is great (i.e., the separation distance is greater than or equal to a specified distance), and the first seatback 3B tilts in the seat front direction, for example, to a maximum extent, then the second seatback 5B will not interfere with the first seatback 3B.

The controller 10 reads the respective output signals from the first angle sensor S1, the first position sensor S3, and the second position sensor S4, and executes the first determination process. If the controller 10 determines that the second seatback 5B will not interfere with the first seatback 3B, then the controller 10 causes the second seatback 5B to tilt at the second pivoting speed V2.

2.2 Details of Tilt Control

Figure 3:
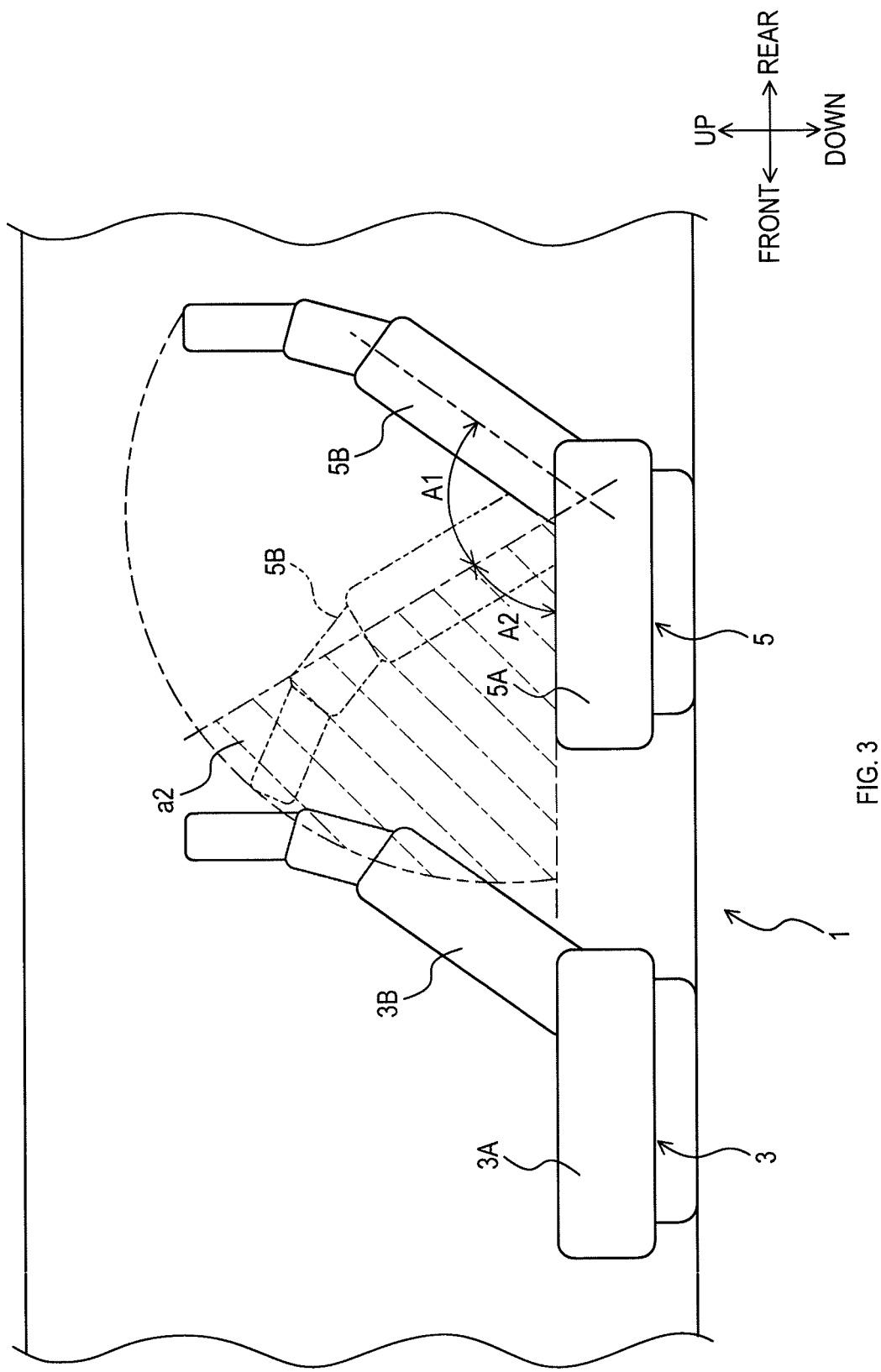
FIG. 3 is a schematic view showing a configuration of the vehicle seat system.

In an entire pivoting range of the second seatback 5B when the second seatback 5B tilts in the seat front direction, a pivoting range in which interference between the second seatback 5B and the first seatback 3B does not occur is defined as a non-interference range A1 (see FIG. 3). When the second seatback 5B is positioned in at least a part of the non-interference range A1, the controller 10 executes the first pivot control.

Independently of the first determination process, the controller 10 also determines whether the second seatback 5B will interfere with the first seatback 3B after the second seatback 5B starts to tilt (a second determination process). If the controller 10 determines in the second determination process that the second seatback 5B will not interfere with the first seatback 3B, then the controller 10 executes the second pivot control to cause the second seatback 5B to tilt at the second pivoting speed V2.

During the third pivot control, in which both the first seatback 3B and the second seatback 5B pivot, the non-interference range A1 and an interference range A2 (see FIG. 3) change with time. In response to such changes, the controller 10 operates as described below in order to reduce computation load.

By using information of the position of the first vehicle seat 3 and the reclining angle of the first seatback 3B when the luggage space expansion switch SW1 is turned on, the controller 10 determines the non-interference range A1.

If the first seatback 3B and the second seatback 5B are both positioned in the interference range A2, then the controller 10 determines that the second seatback 5B will interfere with the first seatback 3B. In the entire pivoting range of the second seatback 5B, the interference range A2 is located on a tilting side relative to the non-interference range A1. "The first seatback 3B is positioned in the interference range A2" means a state where at least a part of the first seatback 3B is positioned in a fan-shaped area a2 (see FIG. 3) that is formed by a predicted trajectory of the second seatback 5B pivoting in the interference range A2.

The controller 10 executes the second determination process based on whether the first seatback 3B is positioned in the interference range A2. If the first seatback 3B has left the interference range A2, the controller 10 determines that the second seatback 5B will not interfere with the first seatback 3B. In an actual control process, whether the first seatback 3B has left the interference range A2 may be determined simply based on the reclining angle of the first seatback 3B. Hereinafter, a position of the first seatback 3B (also understandable as the reclining angle of the first seatback 3B) when the first seatback 3B has left the interference range A2 is also referred to as an "avoidance position".

Figure 4:
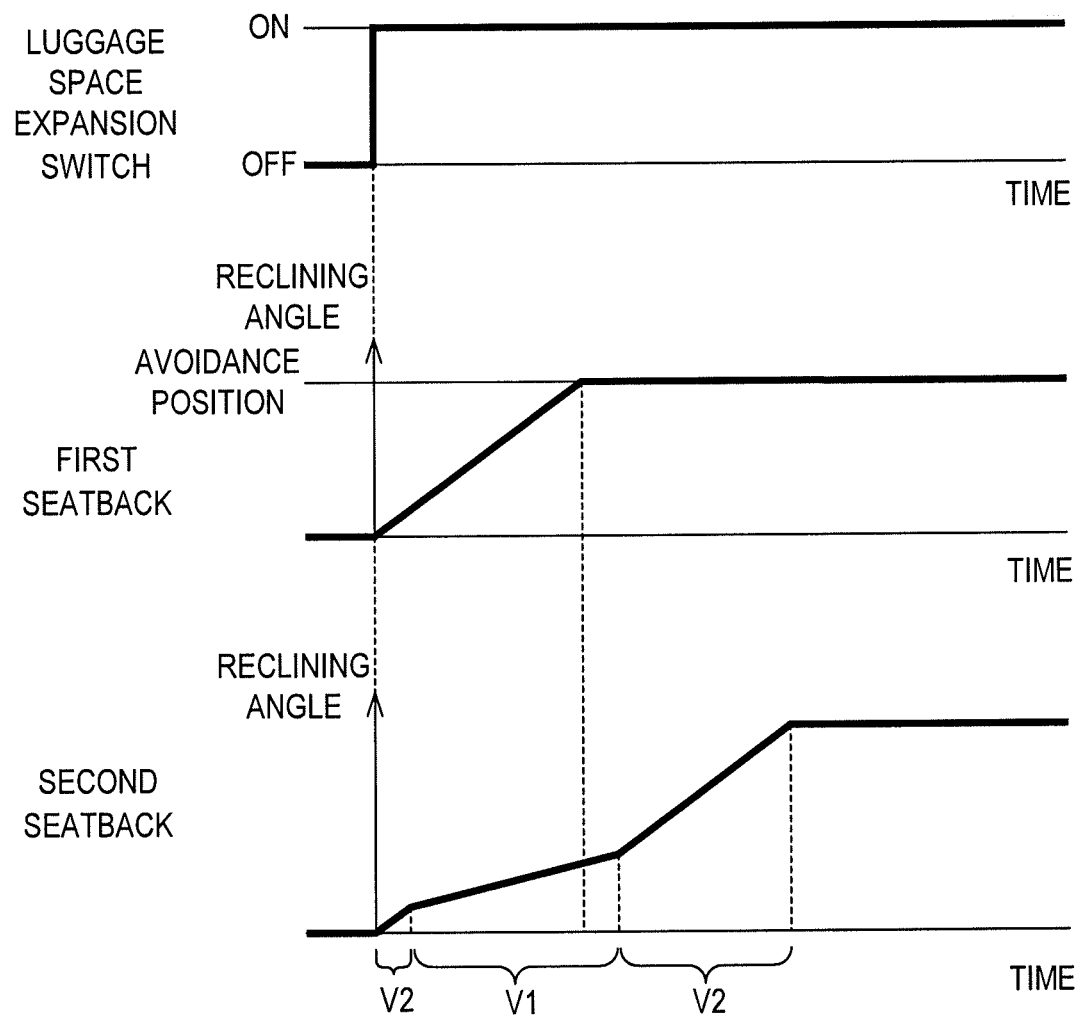
FIG. 4 is a time chart showing an operation of the vehicle seat system in a first embodiment.

FIG. 4 shows a detailed operation of the third pivot control. During execution of the third pivot control, the controller 10 causes the first seatback 3B to pivot in the seat front direction.

In conjunction with the start of pivoting of the first seatback 3B, the controller 10 causes the second seatback 5B to pivot in the seat front direction at the second pivoting speed V2 until a predetermined specified time has elapsed or until the position (angle) of the first seatback 3B has reached a specified reclining angle.

The controller 10 causes the second seatback 5B to pivot in the seat front direction at the first pivoting speed V1 when an elapsed time from the start of the third pivot control has reached a specified time, or when the position (angle) of the first seatback 3B has reached the specified reclining angle.

The controller 10 stops pivoting of the first seatback 3B when the second seatback 5B has left the non-interference range A1, or when the first seatback 3B has reached the avoidance position, and increases the pivoting speed of the second seatback 5B from the first pivoting speed V1 to the second pivoting speed V2.

A time point when the second seatback 5B leaves the non-interference range A1 and a time point when the first seatback 3B reaches the avoidance position do or do not coincide with each other.

In a case where the first seatback 3B pivots at a specified speed in the seat front direction, the first seatback 3B has reached the avoidance position, depending on the specified speed, when the second seatback 5B leaves the non-interference range A1. For example, if the first seatback 3B pivots at the second pivoting speed V2, then the first seatback 3B usually has reached the avoidance position when the second seatback 5B leaves the non-interference range A1. In this case, the second seatback 5B will not interfere with the first seatback 3B when the second seatback 5B leaves (or is outside) the non-interference range A1.

When the reclining angle of the second seatback 5B becomes greater than or equal to a specified angle, and the second seatback 5B is brought into a specified tilted state, the controller 10 stops pivoting of the second seatback 5B.

3. Features of Vehicle Seat System in First Embodiment

The controller 10 controls pivoting of the first seatback 3B and pivoting of the second seatback 5B, and also executes the tilt control to cause the second seatback 5B to tilt in the seat front direction.

The controller 10 executes the first pivot control to cause the second seatback 5B to pivot at the first pivoting speed V1, the second pivot control to cause the second seatback 5B to pivot at the second pivoting speed V2 that is greater than the first pivoting speed V1, and a determination process to determine whether the second seatback 5B will interfere with the first seatback 3B during execution of the tilt control.

Also, during execution of the tilt control, if the controller 10 determines that the second seatback 5B will interfere with the first seatback 3B, then the controller 10 causes the first seatback 3B to pivot and executes the first pivot control in at least a part of the pivoting process of the second seatback 5B (the third pivot control).

During execution of the tilt control, the second seatback 5B as well as the first seatback 3B pivots, while avoiding interference between the first seatback 3B and the second seatback 5B. By maintaining pivoting of the first and second seatbacks 3B, 5B, a user's misunderstanding can be reduced that "a failure in the tilt control has occurred".

During execution of the tilt control, the second seatback 5B pivots at the first pivoting speed V1, which is less than the second pivoting speed V2, while the first seatback 3B is pivoting; thus, occurrence of interference between the second seatback 5B and the first seatback 3B can be reduced.

During execution of the tilt control, if the second seatback 5B pivots at the second pivoting speed V2 while the first seatback 3B is pivoting, then it may be highly likely that the second seatback 5B will reach the interference range A2, in which the first seatback 3B and the second seatback 5B are likely to interfere with each other, before the first seatback 3B leaves the interference range A2.

When the second seatback 5B pivots at the first pivoting speed V1 that is less than the second pivoting speed V2, the first seatback 3B can leave the interference range A2 before the second seatback 5B reaches the interference range A2. Then, occurrence of interference between the second seatback 5B and the first seatback 3B can be reduced.

The controller 10 causes the second seatback 5B to pivot at the first pivoting speed V1 when the second seatback 5B is positioned in at least a part of the non-interference range A1. This enables reduction in occurrence of interference between the second seatback 5B and the first seatback 3B.

The controller 10 determines, after the second seatback 5B starts to tilt, whether the second seatback 5B will interfere with the first seatback 3B. If determining that the second seatback 5B will not interfere, then the controller 10 causes the second seatback 5B to pivot at the second pivoting speed V2.

Accordingly, the vehicle seat system 1 can achieve reduction in time required until completion of tilting, as compared with a case where the second seatback 5B pivots at the first pivoting speed V1 continuously until completion of tilting.

Second Embodiment

The controller 10 of the first embodiment causes the second seatback 5B to pivot at the second pivoting speed V2 when the luggage space expansion switch SW1 is turned on, and thereafter reduces the pivoting speed of the second seatback 5B to the first pivoting speed V1.

Figure 5:
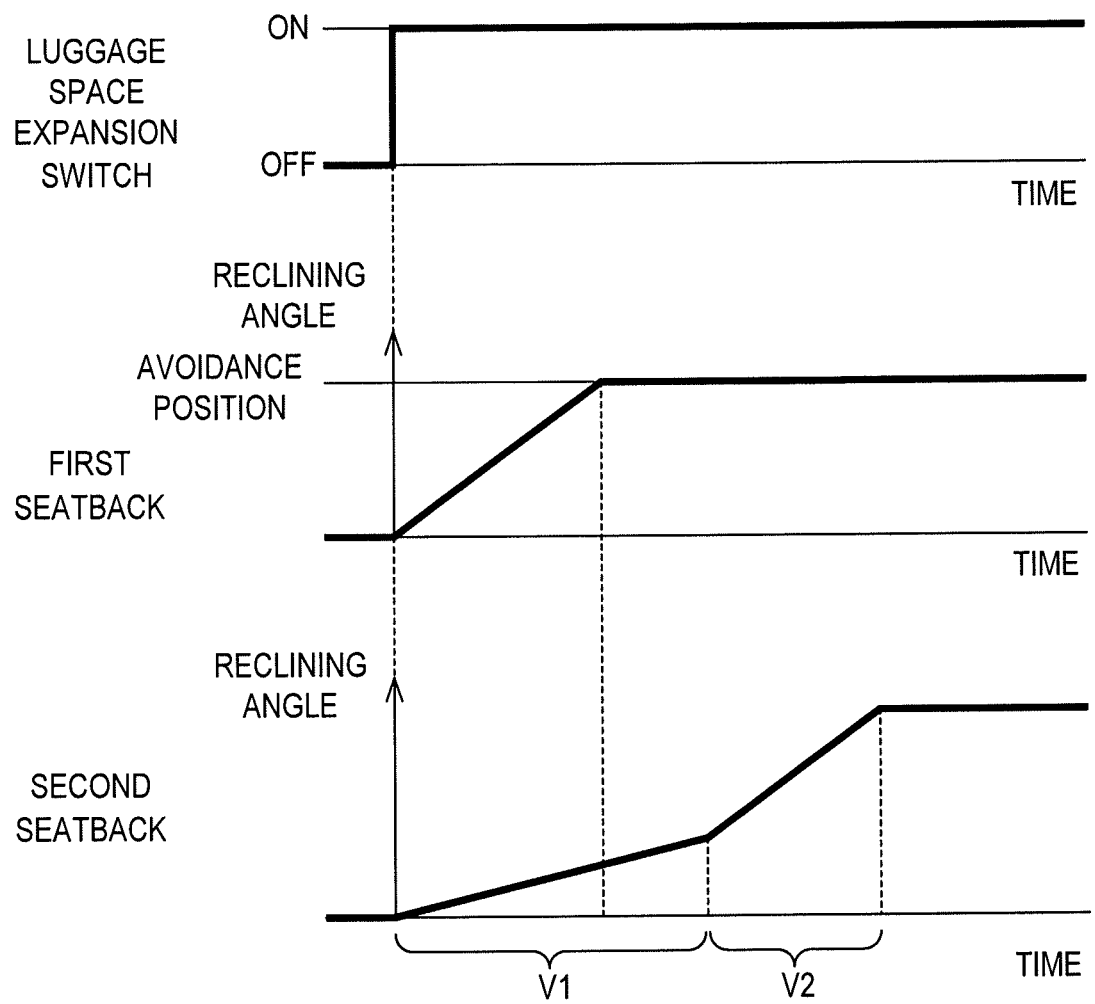
FIG. 5 is a time chart showing an operation of the vehicle seat system in a second embodiment.

In contrast, as shown in FIG. 5, the controller 10 of a second embodiment causes the second seatback 5B to pivot at the first pivoting speed V1 from the beginning when the luggage space expansion switch SW1 is turned on.

Then, the controller 10 increases the pivoting speed of the second seatback 5B to the second pivoting speed V2 when the second seatback 5B leaves the non-interference range A1. The rest of a control operation is the same as in the first embodiment.

Third Embodiment

The controller 10 of the second embodiment increases the pivoting speed of the second seatback 5B to the second pivoting speed V2 when the second seatback 5B leaves the non-interference range A1.

Figure 6:
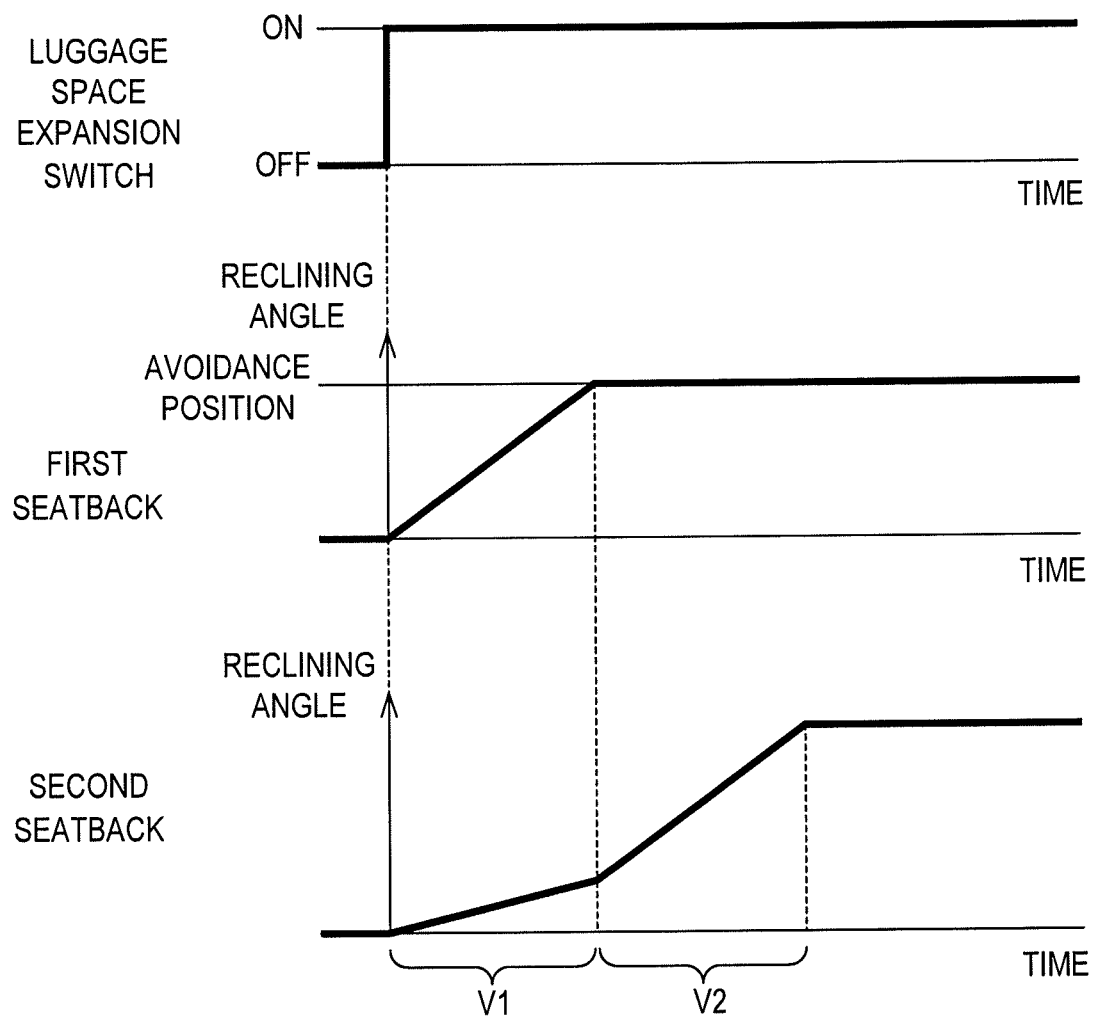
FIG. 6 is a time chart showing an operation of the vehicle seat system in a third embodiment.

In contrast, as shown in FIG. 6, the controller 10 of a third embodiment increases the pivoting speed of the second seatback 5B to the second pivoting speed V2 when the first seatback 3B has reached the avoidance position. The rest of the control operation is the same as in the second embodiment.

Fourth Embodiment

The controller 10 of the third embodiment increases the pivoting speed of the second seatback 5B to the second pivoting speed V2 when the first seatback 3B has actually reached the avoidance position.

In contrast, the controller 10 of a fourth embodiment first computes a time (hereinafter referred to as a "leaving time") from the start of pivoting of the first seatback 3B until reaching the avoidance position, by using respective positions of the first vehicle seat 3 and the second vehicle seat 5, and respective reclining angles of the first seatback 3B and the second seatback 5B when the luggage space expansion switch SW1 is turned on.

Figure 7:
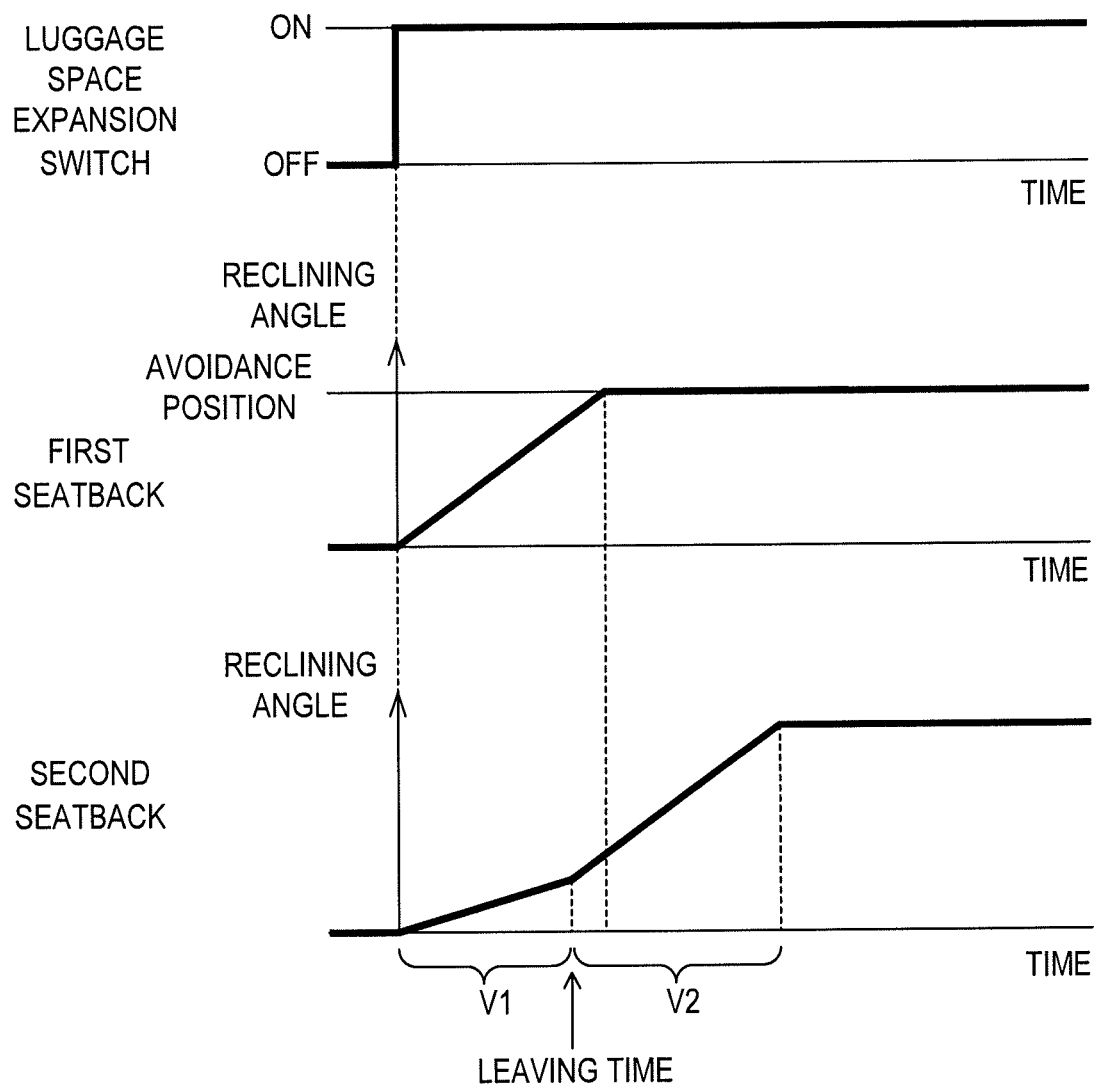
FIG. 7 is a time chart showing an operation of the vehicle seat system in a fourth embodiment.

Subsequently, the controller 10 increases the pivoting speed of the second seatback 5B to the second pivoting speed V2 when an elapsed time from the start of pivoting of the first seatback 3B has reached the leaving time (see FIG. 7). This can reduce time required until completion of tilting in the fourth embodiment. The rest of the control operation is the same as in the third embodiment.

Fifth Embodiment

Figure 8:
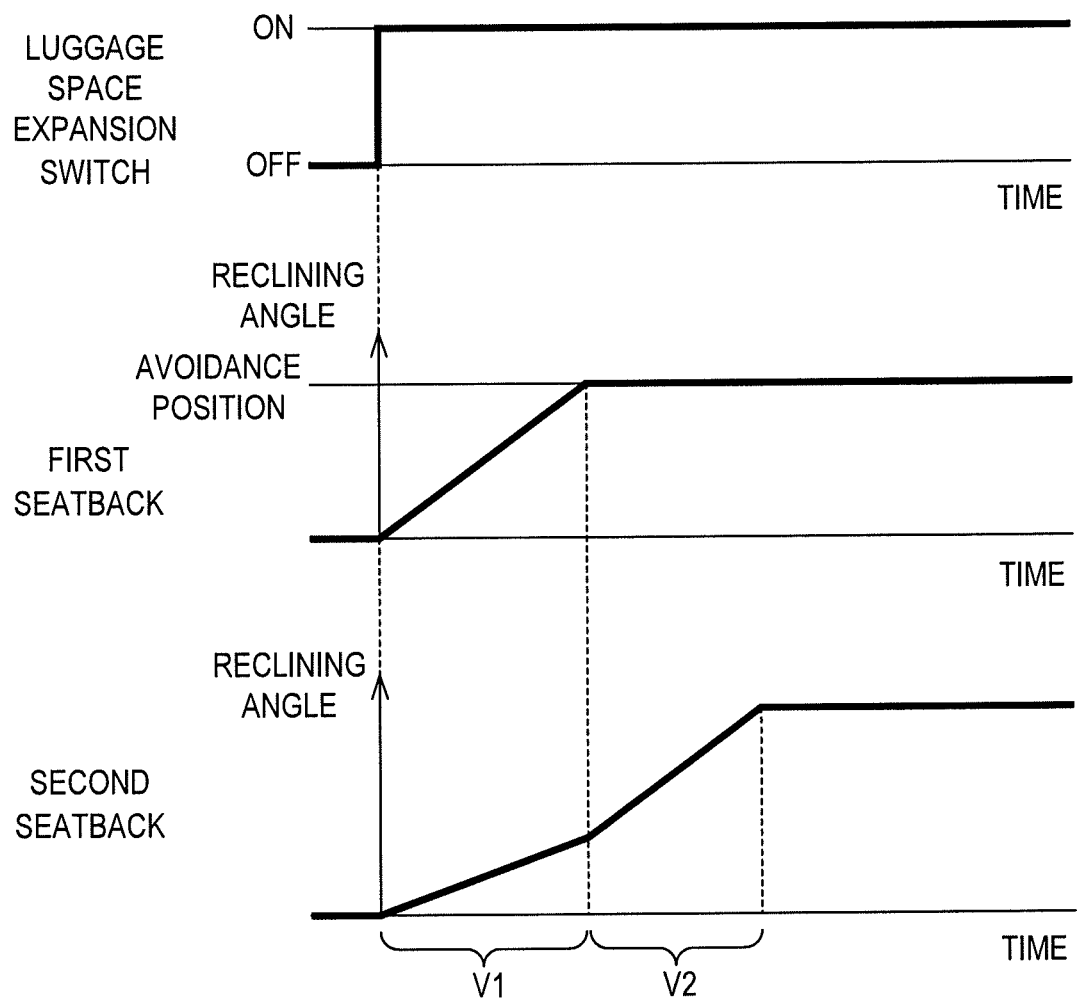
FIG. 8 is a time chart showing an operation of the vehicle seat system in a fifth embodiment.

The first pivoting speed V1 in each of the above-described embodiments is a predetermined fixed value. In contrast, the controller 10 of a fifth embodiment computes and determines the first pivoting speed V1 in accordance with a specified rule. The rest of the control operation is the same as in one of the first to fourth embodiments (see FIG. 8).

More specifically, by using respective positions of the first vehicle seat 3 and the second vehicle seat 5, and respective reclining angles of the first seatback 3B and the second seatback 5B when the luggage space expansion switch SW1 is turned on, the controller 10 computes the first pivoting speed V1.

The controller 10 computes a pivot angle (hereinafter referred to as a "leaving movement angle") by which the second seatback 5B moves until leaving the non-interference range A1. Subsequently, the controller 10 determines an angle speed, which is obtained by dividing the leaving movement angle by the leaving time, as the first pivoting speed V1. This can reduce time required until completion of tilting in the fifth embodiment.

Other Embodiments

By using the position of the first vehicle seat 3 and the reclining angle of the first seatback 3B when the luggage space expansion switch SW1 is turned on, the controller 10 in each of the above-described embodiments determines the non-interference range A1.

However, the present disclosure is not limited to such embodiments. For example, the controller 10 may compute and determine the non-interference range A1 continuously after starting the third pivot control. In other words, the controller 10 may execute the second determination process using the non-interference range A1 that changes with time.

In the above-described embodiments, the pivoting speed of the first seatback 3B and the second pivoting speed V2 of the second seatback 5B are predetermined fixed values. However, the present disclosure is not limited to such embodiments.

For example, the controller 10 may compute a predicted control in which a time required from when the luggage space expansion switch SW1 is turned on until tilting is completed is minimum, and may control operation of the first seatback 3B and the second seatback 5B based on the computed control.

In the tilt control of the above-described embodiments, pivoting of the second seatback 5B is controlled using two pivoting speeds, that is, the first pivoting speed V1 and the second pivoting speed V2. However, the present disclosure is not limited to such embodiments. For example, the pivoting speed of the second seatback 5B may be configured to change in a step-wise manner or a continuous manner during execution of the first pivot control.

In the above-described embodiments, examples of a vehicle seat system in a vehicle have been described. However, the present disclosure is not limited to such examples, but may also be applied to a seat for use in any other vehicles, such as railway vehicles, ships and boats, and aircrafts, and to a stationary seat for use in theaters or households.

Further, any form that falls within the scope of the technical ideas defined by the language of the appended claims may be an embodiment of the present disclosure. Accordingly, a combination of at least two of the above-described embodiments may be another embodiment.

What is claimed is:
1. A vehicle seat system comprising:
a first vehicle seat installed in a vehicle, the first vehicle seat comprising a first seat cushion and a first seatback that is pivotable in a seat front-rear direction;
a second vehicle seat installed rearward of the first vehicle seat in the vehicle, the second vehicle seat comprising a second seat cushion and a second seatback that is pivotable in the seat front-rear direction;
a first electric recliner configured to cause the first seatback to pivot at least in a seat front direction;
a second electric recliner configured to cause the second seatback to pivot at least in the seat front direction; and
a controller configured to control operation of the first recliner and the second recliner, to thereby control pivoting of the first seatback and pivoting of the second seatback, the controller being configured to execute a tilt control to cause the second seatback to tilt in the seat front direction, the controller having a function to execute:
- a first pivot control to cause the second seatback to pivot at a first pivoting speed;
- a second pivot control to cause the second seatback to pivot at a second pivoting speed that is greater than the first pivoting speed; and a first determination process to determine, during execution of the tilt control, whether the second seatback will interfere with the first seatback, the controller being configured to cause the first seatback to pivot and to execute the first pivot control in at least a part of a pivoting process of the second seatback, if determining in the first determination process, during execution of the tilt control, that the second seatback will interfere with the first seatback, the controller being configured to determine a non-interference range based on a position of the first vehicle seat and a reclining angle of the first seatback when the controller receives input of a signal for expanding a luggage space of the vehicle, and the controller further being configured to execute the first pivot control when the second seatback is positioned in at least a part of the non-interference range, the non-interference range being a pivoting range, in an entire pivoting range, of the second seatback within which no interference occurs between the second seatback and the first seatback when the second seatback tilts in the seat front direction, wherein the controller has a function to execute a second determination process to determine, after the second seatback starts to tilt, whether the second seatback will interfere with the first seatback, and wherein the controller executes the second pivot control, if determining in the second determination process that the second seatback will not interfere with the first seatback.

* * * * *